United States Patent [19]

Eppig et al.

[11] 4,434,028
[45] Feb. 28, 1984

[54] APPARATUS FOR REMOVING ORGANIC CONTAMINANTS FROM INORGANIC-RICH MINERAL SOLIDS

[75] Inventors: Christopher P. Eppig, Arlington; Bruce M. Putnam, Wayland; Richard P. de Filippi, Cambridge, all of Mass.

[73] Assignee: Critical Fluid Systems, Inc., Cambridge, Mass.

[21] Appl. No.: 255,037

[22] Filed: Apr. 17, 1981

[51] Int. Cl.³ .............................................. B01D 11/00
[52] U.S. Cl. .................................. 196/14.52; 202/168
[58] Field of Search .................................. 202/168–170; 422/261, 284, 281; 196/14.52; 134/40, 31; 175/206, 207, 212; 23/306, 307; 423/658.5; 208/311, 314, 320–324; 585/808, 861

[56] References Cited

U.S. PATENT DOCUMENTS 2,152,665  4/1939  Rosenthal .......................... 202/168
3,177,263  4/1965  Francis ................................ 208/321

Primary Examiner—Frank Sever

Attorney, Agent, or Firm—Schiller & Pandiscio

[57] ABSTRACT

Method and apparatus for removing oil and other organic constituents from particulate, inorganic-rich mineral solids. The method and apparatus are particularly suitable for removing oil from oil-contaminated drill cuttings. The solids to be treated are transferred into pressure vessel means wherein they are contacted with an extractant which is normally a gas but is under conditions of pressure and temperature to provide the extractant in a fluidic solvent state for the constituents to be removed, whereby the constituents are transferred to the extractant. The extractant containing the constituents is withdrawn from the pressure vessel and depressurized to render it a nonsolvent for the constituents and to form a two-phase system which can then be separated into extractant for repressurizing and recycling with proper handling of the constituents removed. In the case of removing oil from drill cuttings, the essentially oil-free cuttings can be disposed of in any suitable manner including dumping overboard from an offshore drilling rig.

17 Claims, 4 Drawing Figures

APPARATUS FOR REMOVING ORGANIC CONTAMINANTS FROM INORGANIC-RICH MINERAL SOLIDS

This invention relates to the removal of one or more organic constituents from particulate, inorganic-rich mineral solids and more particularly to process and apparatus for removing oil from oil-contaminated cuttings resulting from oil well drilling.

So called "drilling muds" are fluids used to control formation pressures, lubricate and cool the bit, flush drill cuttings from the borehole, and form a consolidated wall cake on the sides of the hole prior to casing. These muds, which are highly viscous, are complex formulations and include such finely divided materials as ground ilmenite, bentonite, various clays, barite, lead ore, fibers, hulls, etc. in a liquid medium which may be aqueous (e.g., water or brine) or an oil (e.g., diesel oil). The latter, the so-called oil muds, have been found to be particularly advantageous in solving certain drilling problems, especially those associated with shale drilling and those encountered in offshore operations. Thus oil muds have been found to solve such offshore drilling problems as hole instability, shale sloughing, salt flow and excessive corrosion. The oil muds are, moreover, particularly suited to high-temperature conditions and they help reduce the wear of downhole drilling motors.

There is, however, a serious problem inherent in the use of drilling muds, particularly the oil muds, in offshore drilling. This is the problem of disposing of the drill cuttings which, after separation from the mud pumped up from the well, carry oil on their surfaces and often within their porous structure. In many instances the oil-contaminated cuttings also carry surfactants and other mud additives.

Since environmental regulations prohibit the dumping overboard of the oil-contaminated cuttings from an offshore drilling rig, it is necessary to provide some way to clean them or to otherwise dispose of them.

As pointed out in the article "Cuttings Can Meet Offshore Environment Specifications," *Oil and Gas Journal*, Aug. 14, 1972, pp. 73-76, the two general choices to achieve disposal of the cuttings have been the cleaning of the cuttings on the rig or the relatively costly hauling of the cuttings to onshore disposal sites. Cleaning has been done either by washing using a suitable detergent; by burning off the oil using high-intensity lamps to expose the cuttings to about 2200° C. or by vacuum distillation. Solvent extraction has also been suggested. Washing of the cuttings requires the handling of large volumes of a wash solution; burning off the oil raises the risk of fire as well as of the failure to equally expose all the cuttings to the lamps; and vacuum distillation requires large capital outlays. U.S. Pat. No. 4,242,146, presents as an alternative to these generally used techniques of oil removal the compacting of the oil-contaminated cuttings and a special surfactant with an oil-absorbent material to bind the oil followed by the subsequent dumping overboard of the compacted material. Although the compacted material will apparently sink to a level depending upon its density, there seems to be present the long-range possibility that the compacted material will disintegrate, rise to the surface and bring oil with it. Moreover, this technique requires the continual supplying of the expendable surfactant and absorbent material to the offshore rig, a requirement which adds to the cost of the drilling.

It is apparent that there is a real need for an improved method and apparatus for cleaning drill cuttings so that they may be disposed of without introducing any pollution problems. Although this need is at present particularly urgent in offshore drilling operations where it is highly desirable to be able to dump the cuttings overboard off the rig, it may in time become equally important in onshore drilling operations if and when regulations make it no longer possible to provide disposal sites for the oil-contaminated drillings.

Inasmuch as drilling muds contain such additives as emulsifiers and surfactants it may be desirable or necessary to periodically remove an excessive buildup of such materials in recycled muds. It may also be desirable or necessary to process oil-based muds which have become degraded to recover the oil and dispose of the solid materials.

Particulate, inorganic-rich mineral solids other than drill cuttings may require that they be separated from oil. For example, oil may be physically mixed with mineral solids, e.g., sand, either through a geological process or through some inadvertent happening such as an oil spill. Such physical mixtures of oil and particulate, inorganic-rich mineral solids may be subjected to the method of this invention to separate the two components.

Although the method and apparatus of this invention will, for convenience, be described in terms of removing oil from drill cuttings, it will be understood that they are equally useful for removing organic constituents from mineral solids such as detailed above.

It is therefore a primary object of this invention to provide a novel method for removing one or more organic constituents from particulate, inorganic-rich mineral solids wherein the organic material is not chemically bonded to the mineral.

It is another primary object of this invention to provide an improved method for treating drill cuttings to remove oil and other additives from them. It is another object of this invention to provide a method of the character described which makes it possible to dispose of the treated cuttings by dumping them overboard from an offshore rig without polluting the water. A further object is to provide such a method which is based on the use of a recycling extractant and requires the supplying of only makeup extractant. It is still another object to provide a method of the character described which provides flexibility with regard to such factors as the types of mud being used, the character of the cuttings being brought up, and the degree to which mud components can be recovered and/or recycled.

It is a further primary object of this invention to provide improved apparatus and a system embodying it, suitable for onshore or offshore installation, for treating drill cuttings or other particulate inorganic-rich mineral solids to remove oil or other organic contaminants therefrom. It is another object to provide apparatus of the character described which achieves the removal of oil from cuttings to a degree which permits the disposal of the cuttings without creating pollution problems. Still another object is to provide such apparatus which makes possible the recycling of extractant, recovery of mud components and the efficient use of the energy supplied to the system.

Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

According to one aspect of this invention there is provided a method of removing contaminants including oil from particulate, inorganic-rich mineral solids comprising the steps of contacting such mineral solids with an extractant comprising a gas maintained under conditions of pressure and temperature to provide the extractant in a fluidic state and render it a solvent for the organic contaminant; and separating the extractant with the contaminant contained therein from the mineral solids.

According to another aspect of this invention there is provided a method of removing oil from particulate, inorganic-rich mineral solids, comprising the steps of contacting the mineral solids in a pressure vessel with an extractant which is a gas under a pressure and at a temperature to convert the gas to a fluidic oil-solvent state thereby to dissolve the oil in the extractant and form an effluent containing an extractant-oil solution; separating the effluent from the resulting essentially oil-free mineral solids; subjecting the effluent to sufficient depressurization to render the extractant a nonsolvent for the oil and form a two-phase depressurization product; and separating the two-phase depressurization product into oil and extractant for recycling.

According to yet another aspect of this invention there is provided a system for removing organic contaminants including oil from particulate, inorganic-rich, mineral solids comprising, in combination pressure vessel means arranged to effect contact between particulate, inorganic-rich, mineral solids containing an organic contaminant and an extractant for the contaminant which is a gas maintained under conditions of pressure and temperature to convert it to the fluidic solvent state for the contaminant; means to circulate the extractant in the fluidic solvent state through the pressure vessel means thereby to form an effluent containing the contaminant; depressurizing means to depressurize the effluent to form two phases comprising a vapor phase containing the extractant and a liquid phase containing the contaminant; separating means to separate the vapor and liquid phases; and means to withdraw the essentially contaminant-free solids from the pressure vessel means for disposal.

For a fuller understanding of the nature and objects of the invention, reference should be had to the following detailed description taken in connection with the accompanying drawings in which FIG. 1 is a diagram setting forth the basic steps of the method of this invention;

In the following detailed description the removal of oil from drill cuttings carried in an oil-based mud will be taken as exemplary of the method and apparatus of this invention.

Figure 1:
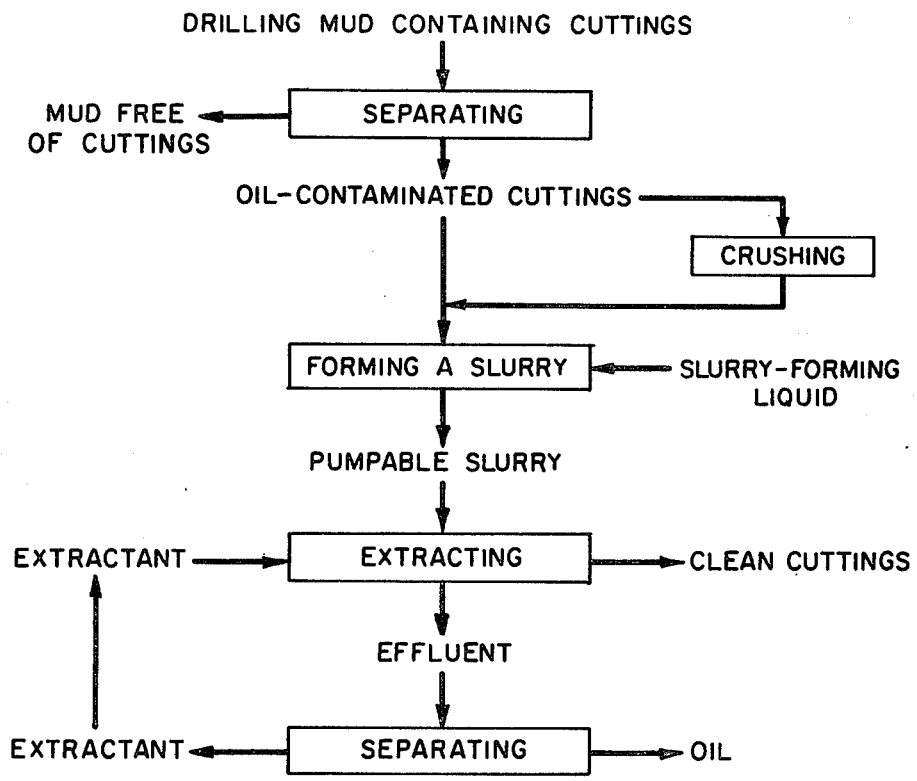

As shown diagrammatically in FIG. 1, the drilling mud brought up from the borehole contains the cuttings from which the oil must be removed. If the mud used is oil-based then the oil on the cuttings is the oil in the mud or a mixture of the oil in the mud and oil from the well; if the mud used is water-based, then contaminants on the cuttings may be various organic additives added to the mud and/or any oil from the well. Although it is generally preferable to remove as much of the mud from the cuttings as possible before treating them, it is possible to treat the cuttings without separating them from the mud in which case the oil in the mud is also extracted. Separation of the cuttings from the mud is typically performed by a screening machine or a "shale shaker" which comprises a screen of a suitable mesh size to ensure that the mud can fall through and the cuttings be retained for further treatment. In the case of oil-based mud, the cuttings resulting from the screening may have up to about 50% by cuttings weight of oil adhered to the surface as well as within the pores if the cuttings are formed of a porous material. Moreover, the cuttings may also have adhered to them such mud additives as surfactants, hydrophobic agents, emulsifying agents, chelating agents and the like. There are at present restrictions on the maximum oil content of any cuttings dumped overboard from offshore drilling platforms and all indications are that such restrictions may be made more stringent.

Once the oil-contaminated drill cuttings are separated from the mud it may be desirable or necessary to crush the separated cuttings to provide an optimum size range of these cuttings commensurate with the operating characteristics of the remaining apparatus making up the treating system and of the processing fluids employed. Such an optimum size range is readily determined for any one overall system; and it will depend upon such factors as the level of residual oil which can be tolerated, the porosity of the drill cuttings, and the like. It is preferable that they be sized no larger than 10 Tyler mesh.

The oil-contaminated cuttings within a predetermined size range are then conveyed to a pressure extraction column. This conveying is preferably accomplished by forming the cuttings into a pumpable slurry, using an oil or an aqueous liquid to form the slurry, and pumping them into the column. Diesel oil may be taken as exemplary of a slurry-forming oil; and seawater or brine as exemplary of an aqueous liquid. It will be appreciated that other oils and aqueous liquids, including fresh water, may be used; however, in the following detailed description it will be assumed for convenience that either diesel fuel or seawater is used. It is, of course, desirable to form a pumpable cuttings slurry having as high a solids content as it is possible to handle with the pump or pumps being used. Normally, a solids content of about 50% by slurry weight represents such a maximum.

As previously noted, either a water-based mud or an oil-based mud may be used in drilling. The use of these two different muds along with the fact that the steps of separating the cuttings from the mud and/or the step of crushing the cuttings may be omitted give rise to a number of possibilities both with regard to the steps taken prior to slurrying and to the slurries formed for further processing. Thus if the cuttings are brought from the well in a water-based mud, they may contain oil and/or other organic contaminants, e.g., mud additives such as surfactants and the like. Such water-based mud may be made directly into a slurry; or, alternatively, the cuttings may be separated from it, crushed if required, and then formed into an aqueous or an oil slurry. If, however the cuttings are brought up in an oil-based mud, they will be contaminated principally with oil. This mud with cuttings may be formed directly into an oil slurry; or the cuttings may be separated from it, crushed if required, and then formed into a water or preferably an oil slurry.

The cuttings are conveyed to the extraction vessel to be contacted by an extractant. If they are conveyed in a slurry then excess slurrying oil or water is preferably drained or forced from the slurry immediately prior to the extracting step.

The extractant used is a material which is in a gaseous state at normal pressure and temperature and which can be converted to a solvent fluidic state, e.g., a liquid or supercritical fluid, by subjecting it to a combination of pressure and temperature which changes its physical state. It is usually preferable to use as extractants gases having a molecular weight no greater than about 200. Among such extractants suitable for this invention are carbon dioxide, ethane, ethylene, propane, propylene, and other hydrocarbons, and the gaseous halogenated hydrocarbons such as dichlorodifluoromethane.

Preferred extractants for the method of this invention are dichlorodifluoromethane ($T_c$ 120.0° C.; $P_c$ 40.6 atmospheres); propane ($T_c$, 95.6° C.; $P_c$, 43 atmospheres); and carbon dioxide ($T_c$, 31.1° C.; $P_c$, 73 atmospheres). Carbon dioxide, although requiring a higher pressure than propane, may be a preferred extractant since it is inexpensive, nonpolluting in itself and a relatively good solvent over pressure and temperature ranges which do not place undue requirements on the mechanical strength of the equipment used. Carbon dioxide may be maintained in the desired fluidic state under pressures between about 50 and 220 atmospheres and at temperatures between about 15° C. and about 150° C. Propane and dichlorodifluoromethane may be used over the same temperature range and over pressure ranges of 8 and 220 atmosphere and 4.8 to 220 atmospheres, respectively.

The ability of carbon dioxide as a liquid in its near critical state and as a fluid in its supercritical state to serve as an extracting solvent has been known for a number of years. [See for example Francis, A. W., J. Phys. Chem. 58, 1099 (1954) and Ind. Eng. Chem. 47, 230 (1955).] Near critical and supercritical fluids, including carbon dioxide, have been suggested as solvents for a wide range of materials including various oils (U.S. Pat. Nos. 1,805,751, 2,130,147, 2,281,865); flavor components (U.S. Pat. No. 3,477,856); caffein in coffee (U.S. Pat. No. 3,842,847); cocoa butter from a cocoa mass (U.S. Pat. No. 3,923,847); fats from grains and the like (U.S. Pat. No. 3,939,281); residual hexane from de-fatted grain (U.S. Pat. No. 3,966,981); and a variety of materials such as paraffins, glycerol, oils and fats from a variety of compositions (U.S. Pat. No. 3,969,196). A very detailed review of the general field of extraction with supercritical gases is to be found in Angewandte Chemie—International Edition in English, 17:10, pp. 701–784 (October 1978).

The extracting step is carried out at a temperature determined by the choice of temperature/pressure conditions to render the extractant a solvent for the oil adhered to the cuttings and any oil present in the slurry. Once the oil has been transferred from the cuttings to the extractant by being dissolved therein, the cleaned, oil-free cuttings are separated from the oil-extractant solution and dumped overboard from an offshore rig or taken from an onshore drilling operation to a suitable disposal site.

The extractant is recovered by subjecting the effluent from the extraction step to a change in physical condition to render it a nonsolvent for the oil. Normally, this may be accomplished by reducing the pressure on the effluent, the extent to which the pressure is reduced to convert the extractant to a nonsolvent state for the oil being dependent upon the extractant used and upon the temperature of the solution. The rendering of the extractant a nonsolvent for the oil results in the formation of a two-phase system which is then separated into a phase enriched in oil and a nonsolvent extractant phase. Adjusting the pressure, and the temperature if required, reconverts the extractant to a solvent condition for the oil and puts it in condition for recycling. Essentially complete separation of the oil and extractant in the effluent produces an oil of such a quality that it may be added to the drilling mud, reused to form a pumpable slurry or used in any other way desired.

Figure 2:
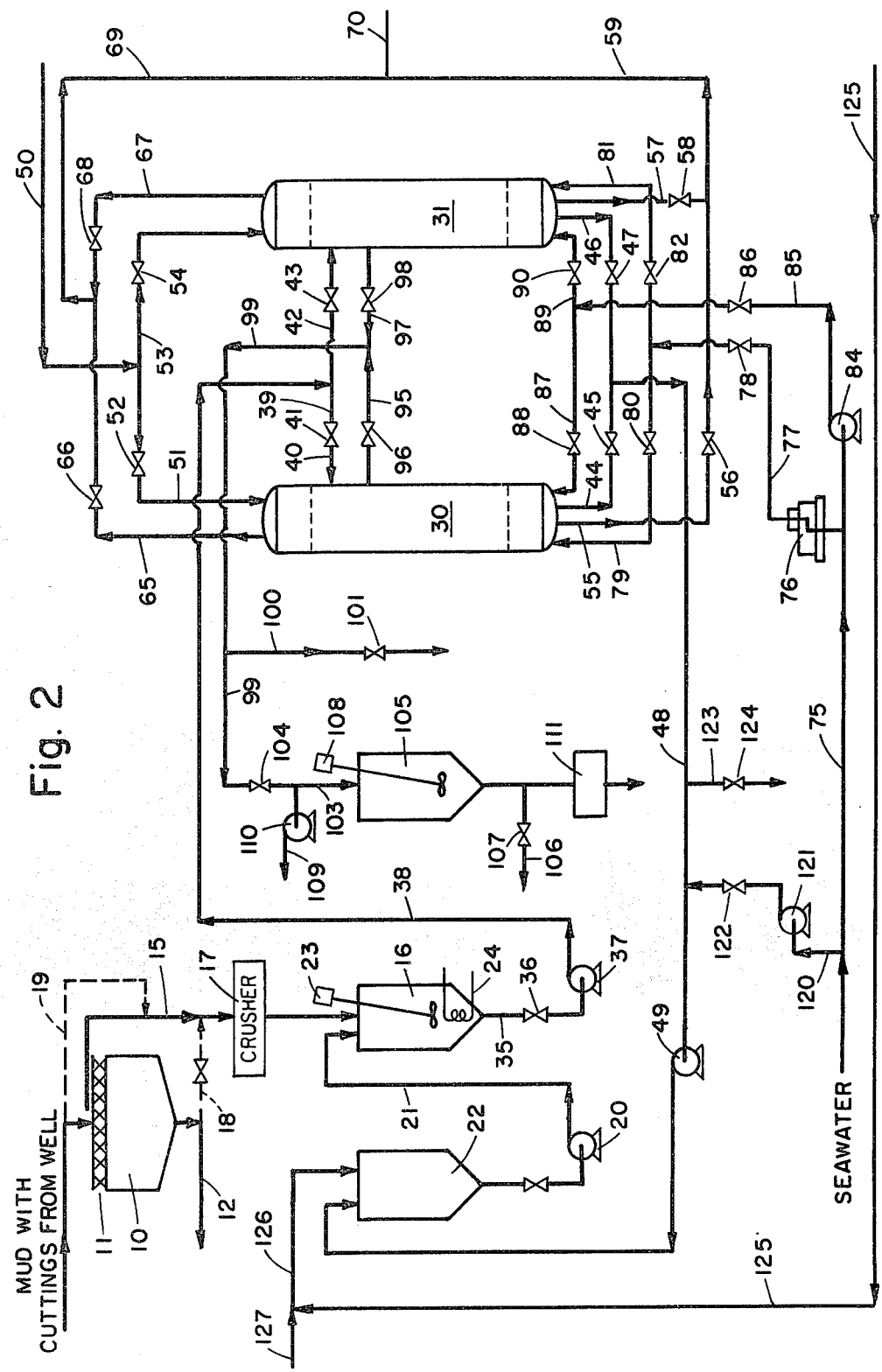
FIG. 2 is a detailed flow diagram illustrating exemplary apparatus for the system of this invention up to the point of separating the extractant and the oil to recover them.

FIG. 2 presents a detailed flow diagram of a system suitable for carrying out the method of this invention. The mud with the drill cuttings is pumped out of the well at a temperature which depends upon the location, depth of well, etc. Although it is possible to transfer the mud from the well to mud storage means before treating the cuttings, it is preferable to treat the cuttings directly to eliminate the need for storage volume. Thus, as shown in FIG. 2, the mud is preferably transported directly from the well to a cuttings separator 10, e.g., a shale shaker which has a screen 11 of a mesh size suitable to retain essentially all of the cuttings above a predetermined size, e.g., greater than about 50 $\mu$m. The mud from which the cuttings have been removed, is then taken through line 12 to a mud pit (not shown) for reuse.

If the cuttings are to be conveyed to the extraction vessel as a slurry, the cuttings retained on screen 11 are taken by line 15 to a slurrying tank 16. If the cuttings are to be reduced in size, such as by crushing, they are sent through a crusher 17, e.g., a smooth roll crusher, in line 15. As indicated by dotted lines 18 and 19 a portion of the mud from separator 10 or all of the mud from the well may be sent to the slurrying tank. It may be desirable to periodically process all of the mud from the well to reduce the amount of particulate fines e.g., cuttings which pass through screen 11. An excessive amount of such fines may increase the viscosity of the mud beyond a level where it is feasible to pump it into and out of the well.

As previously noted, the slurry-forming liquid may be an oil, e.g., one having a boiling range between about 175° C. and about 350° C., or an aqueous liquid. Diesel oil is particularly suited as a slurrying liquid. Liquid to form the slurry is pumped by pump 20 through valved-controlled line 21 from slurry liquid makeup tank 22 into slurrying tank 16. Slurrying tank 16 is equipped with suitable stirring means 23 and a heater 24 controlled to bring the temperature of the slurry up to that at which it is desired to operate the extractor columns 30 and 31 which are preferably thermally insulated. In the system diagrammed in FIG. 2, two extractor columns are shown in parallel, an arrangement which permits essentially continuous operation by using one for carrying out the extracting step while depressurizing, discharging, refilling and repressurizing the other. It is, of course, to be understood that one or more such extractor columns may be used.

The slurry at the desired temperature is withdrawn from slurrying tank 16 through line 35 and flow control valve 36, and it is then pumped by slurry pump 37 through line 38 to a slurry inlet line 39 having a branch line 40, controlled by valve 41, into extractor column 30 and a branch line 42, controlled by value 43, into extractor column 31.

Although FIG. 2 illustrates the conveying of the drill cuttings, along with any mud, by forming a slurry and pumping the slurry, the cuttings and mud may be transferred to the extraction columns by mechanical means such as a screw conveyor, thus eliminating the need for slurrying tank 16, slurry makeup liquid tank 22, pumps 20 and 37 and the attendant transfer lines.

When a slurry is used to convey the cuttings to the extractor columns 30 and 31 it is preferable first to drain off as much of the slurry liquid as possible before contacting the contaminated chips with the extractant. To this end, columns 30 and 31 are provided at the bottom end with screens of the desired mesh to retain the cuttings. The slurry liquid passing through the screen is then drained or forced from the columns through slurry drawoff lines, i.e., line 44, controlled by valve 45, for column 30, and line 46 controlled by valve 47 for column 31. These lines converge into line 48 which leads back to slurry liquid makeup tank 22, thus making it possible to recycle the slurry-forming liquid. A pump 49 may be provided to pump the liquid in line 48.

Once the extractor column is filled to a predetermined level with the drill cuttings to be treated, the extractant at the desired temperature and pressure is circulated through the extractor column until the oil on and/or within the pores of the drill cuttings has been removed to attain the desired contaminant level. In circulating the extractant it is brought in through extractant supply line 50 through a branch line 51, controlled by valve 52, to column 30; and through branch line 53, controlled by valve 54, to column 31. In cycling through the columns, the extractant containing oil, i.e., the column effluent, is withdrawn from column 30 through branch line 55, controlled by valve 56, and from column 31 through branch line 57, controlled by valve 58, branch lines 55 and 57 feeding into primary effluent discharge line 59. In order to remove the extractant and any oil dissolved therein remaining in the columns after conclusion of an extractant cycle, a water piston is used to force the residual mixture from the extractant columns to leave the cleaned cuttings. Thus, there are provided a branch line 65, controlled by valve 66, from column 30 and a branch line 67, controlled by valve 68, from column 31, which lead into secondary discharge line 69. Primary and secondary discharge lines 59 and 69 converge and form main effluent line 70 which leads to the separation and recovery portion of the systems as detailed in the embodiments diagrammed in FIG. 3.

The water needed to provide the water piston is supplied from any suitable source, e.g., the sea for an offshore rig operation, through main water line 75; and it is pumped by a high-discharge-pressure water pump 76 through line 77 controlled by valve 78, to branch line 79, controlled by valve 80, into column 30 or through branch line 81, controlled by valve 82, into column 31.

Once the residual effluent has been forced from the extractant columns, clean water is pumped in at a rate sufficient to carry out the cleaned, essentially oil-free cuttings. This water is preferably drawn from main water line 75 by pump 84 through line 85, which is controlled by valve 86, and which is connected to branch line 87, controlled by valve 88, leading into column 30 and to branch line 89, controlled by valve 90, leading into column 31. The water carrying the clean cuttings is withdrawn from column 30 through branch line 95, controlled by valve 96, and from column 31 through branch line 97, controlled by valve 98, lines 95 and 97 leading into main cuttings discharge line 99. From line 99 the slurry may be discharged overboard through line 100, controlled by valve 101. Alternatively, if any quantity of mud was processed through the system, it may be desirable to recover the solids content of the mud by running the clean cuttings/water slurry through line 103, controlled by valve 104, into a holding tank 105 from which the heavier solids can periodically be discharged from the bottom through line 106, controlled by valve 107, and the remaining liquid with suspended clay particles, after stirring with stirrer 108, can be pumped by way of line 109 and pump 110 to a suitable separation means (not shown). As an alternative to discharging the cuttings directly into the ocean, it may be desirable to compact them in a compactor 111 to form bricks or pellets which will sink readily beneath the surface.

The slurry drawoff lines 44, 46, and 48 are also used to discharge the water forming the water piston used in forcing out residual oil/extractant effluent after extraction is complete. Any makeup water for the slurry may be drawn from main water line 75 by line 120, pump 121 and valve 122. When water is not used to form the slurry, then that which is discharged through line 48 may be pumped overboard through line 123, having valve 124; and line 120, pump 121 and valve 122 may be omitted. If the slurry is formed with oil, then all or a portion of the oil recovered from the extractant may be carried by line 125, from the oil recovery portion of the system diagrammed in FIG. 3 to oil return line 126 and into tank 22. Any makeup oil can be added through line 127.

Figure 3:
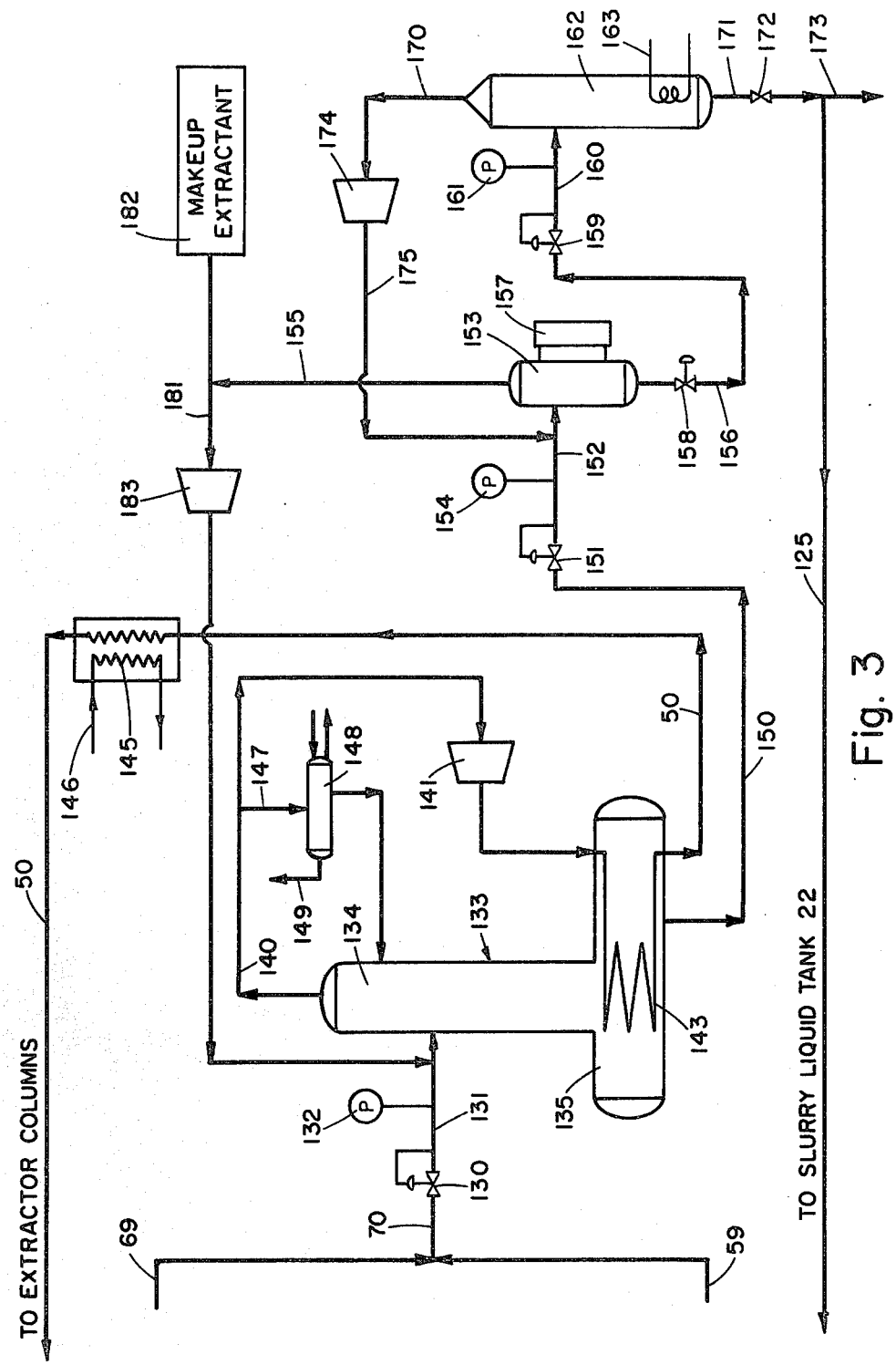
FIG. 3 is a continuation of FIG. 2 illustrating one embodiment of apparatus forming the means for separating the extractant and oil and for recycling one or both.

FIG. 3 is a flow diagram of a preferred embodiment of that section of the system in which the extractant and oil are separated and recovered. As noted above in connection with the description of FIG. 2, the effluent containing a mixture of oil and extractant containing the oil along with whatever mud additives may be dissolved in it, which resulted from the cycling of the extractant through the extractor columns, is withdrawn from the extractor columns 30 and 31 and brought to line 70 through line 59. That effluent containing extractant with oil and additive which is forced out by action of the water piston is withdrawn through line 69 to become part of the total effluent in line 70. This effluent is then depressurized to render the extractant essentially nonsolvent for the oil and also preferably for any other mud additives which may have been dissolved and extracted. It is desirable first to lower the pressure only to the extent that there is formed a separable, two-phase system, i.e., an extractant phase and a phase enriched in oil. In the apparatus illustrated in FIG. 3, this first depressurization is accomplished in a suitable pressure reducing valve 130 between lines 70 and 131; and the resulting pressure in line 131 is monitored by a pressure gage 132.

The two-phase fluid in line 131 is taken into a separator shown as an evaporator 133 which has an upper distillation zone 134 and a lower reboiler zone 135. Extractant vapor from distillation zone 134 is withdrawn in line 140 and compressed in compressor 141 to the pressure at which the extractant is to be cycled through the extractor columns. The resulting heated compressed extractant is then taken by line 142 through a heat exchanger 143 within reboiler zone 135 to provide the heat required in distillation column 133 to boil off the extractant vapor. The thus recovered extractant is then directed into extractant supply line 50 in the extractant cycling loop. If any adjustment in the temperature of the extractant is required prior to its introduction into one of the extractor columns 30 or 31, this may be accomplished in a suitable indirect heat exchanger 145 located in supply line 50. This may be done by circulating a suitable heat transfer fluid through coils 146.

It may be desirable to achieve some refluxing of the extractant vapor leaving evaporator 133 through line 140. To this end there may be provided a reflux return line 147 incorporating a condenser 148 having cold water or any other suitable cooling liquid circulating therethrough. Only a portion of the extractant vapor is sent through this reflux line, and condenser 148 is equipped with a pressure actuated vent 149 which permits the escape of the noncondensables from the system.

Within the evaporator 133 the oil-containing bottoms are circulated in reboiler zone 135 and they are discharged therefrom through bottoms discharge line 150 which leads to a pressure reducing valve 151 connecting line 150 with a line 152 which feeds into an intermediate-pressure flash tank 153 and in which the pressure is monitored by a pressure gage 154. Extractant vapor is discharged from flash tank 153 through line 155 and the liquid further enriched in oil is withdrawn through line 156, there being between line 156 and flash tank 153 a liquid level control system generally indicated by the reference numeral 157 and incorporating a pressure valve 158 in line 156.

The intermediate-pressure fluid from flash tank 153 is then taken by line 156 through another pressure reducing valve 159 and line 160, having pressure gage 161, to a low-pressure flash tank 162, preferably maintained slightly above atmospheric pressure. Low-pressure flash tank 162 may be equipped with a bottom heater 163 to ensure the boiling off of any residual extractant vapor through line 170. The finally recovered, essentially extractant-free oil is forced out through line 171, having a pressure-actuable valve 172. That portion of the recovered oil destined to be recycled is directed through oil recycle line 125 to slurry liquid tank 22 (FIG. 2). Remaining recovered oil is carried through line 173 for any desired use such as makeup to the active mud system.

The extractant vapor in line 170 is compressed in compressor 174 to essentially that pressure obtaining in intermediate-pressure flash tank 153 and taken by line 175 to line 152. Extractant vapor from flash tank 153 is discharged through line 155 into a line 181 leading from a makeup extractant reservoir 182 to a compressor 183 from which the extractant, compressed to essentially that pressure obtaining in evaporator 133, is carried to line 131 for introduction into evaporator 133.

The method and apparatus of this invention may be described further in terms of an example of the operation of the system of FIG. 2 and 3 and in terms of laboratory runs using various extractants to remove oil from drill cuttings.

In describing the operation of the system it will be assumed that diesel oil is used to form the slurry, the drill cuttings are separated from the mud before cleaning, seawater is used to wash out the cuttings and carbon dioxide is used as the extractant. Further, for purposes of illustration, the solvent state of the carbon dioxide extractant will be defined as 150 atmospheres and about 50° C. Finally, it will also be assumed that two extractor columns 30 and 31 will be used and that column 30 is in a condition to receive a charge of the oil/drillings slurry.

Since the mud as it is brought up from the well may be hot, e.g., between about 35° C. and 50° C., the drill cuttings will advantageously retain a large part of their heat, requiring only sufficient heat input into slurry tank 16 to bring the slurry temperature within the desired extraction temperature range. In transferring the slurry to extractor column 30 through lines 38 and 40, valves 36, 41 and 45 remain open and valves 52, 66, 96, 88, 116, 80 and 56 remain closed until column 30 is charged with the desired amount of cuttings. During charging the slurry-forming oil drains out through line 44. Once column 30 has been charged, valves 41 and 45 are closed and valve 52 is opened to deliver the carbon dioxide into the column and pressurize it to 150 atmospheres and raise the temperature to about 50° C. Under these conditions, the carbon dioxide, in a fluidic state, is a solvent for the oil and it therefore extracts it from the surface and pores of the cuttings in forming a carbon dioxide/oil solution which is part of the effluent withdrawn from column 30. Opening valve 56 directs the effluent through lines 55, 59 and 70 into pressure reduction valve 130 in which the pressure is reduced to about 60 atmospheres converting most of the carbon dioxide to a nonsolvent state for the oil.

At the completion of the removal of the effluent mixture of carbon dioxide and oil from column 30 through lines 55 and 59, valve 56 is closed, valve 66 is opened and seawater is brought in through line 75 and pumped by high-discharge-pressure water pump 76 through lines 77 and 79 (valves 78 and 80 being open) into the botton of column 30. Since evaporator 30 is now maintained at about 60 atmospheres the water introduced acts as a piston to force out residual effluent made up of carbon dioxide and oil through lines 65 and 69 into line 70 through line 69.

After the extraction cycle the initially depressurized effluent in line 131 is introduced into evaporator 134 from which carbon dioxide vapor is withdrawn through line 140. A minor amount of this vapor may be condensed in condenser 148 and returned to distillation zone 134 as reflux liquid while most of it is compressed in compressor 141 back up to 150 atmospheres. The heat of compression is therefore available to effect the indirect heating of the liquid in reboiler zone 135 to boil off the carbon dioxide. The oil-containing bottoms from reboiler 135 are depressurized in valve 151 to about 20 atmospheres to flash off additional extractant vapor which is compressed in compressor 183 to about 60 atmospheres prior to being returned to evaporator 133. The 20-atmosphere oil-rich bottoms drawn off through line 156 from flash tank 153 are then let down to about 1.3 atmospheres in valve 159 and taken to flash tank 162 from which the extractant vapor is withdrawn through line 170, recompressed in compressor 174 and returned to flash tank 153 through line 175. The liquid from flash tank 162, which is essentially extractant-free diesel oil, is then withdrawn through line 171, a predetermined amount being returned through line 125 as slurry oil to slurry liquid tank 22 and the remainder being sent to other destinations.

The extractant from heat exchanger 143 is in condition to be recycled through line 50. It may, however, be necessary to effect some change in its temperature which can be done in heat exchanger 145. Makeup extractant from reservoir 182 is compressed to 60 atmospheres and cycled through evaporator 133.

Subsequent to the discharge of the residual effluent from the top of column 30 through the use of the water piston, valve 66 is closed, and valve 116 is opened to discharge the water through lines 115 and 119 into the ocean. Seawater is then pumped through column 30 by pump 84 from main water line 75 through lines 85, valve 86, line 87 and valve 88 to carry the clean cutting out of column 30 through lines 95 and 99 either for direct discharge by way of line 100 or into hold tank 105. With the draining of residual water from column 30 through lines 44 and 48, it is in condition to begin the cycle again.

It will be appreciated that the same cycle is carried out using extractor column 31, phasing the cycle so that while extraction is being carried out in column 30, the steps of depressurizing, discharging, refilling and repressurizing are being carried out in column 31.

Figure 4:
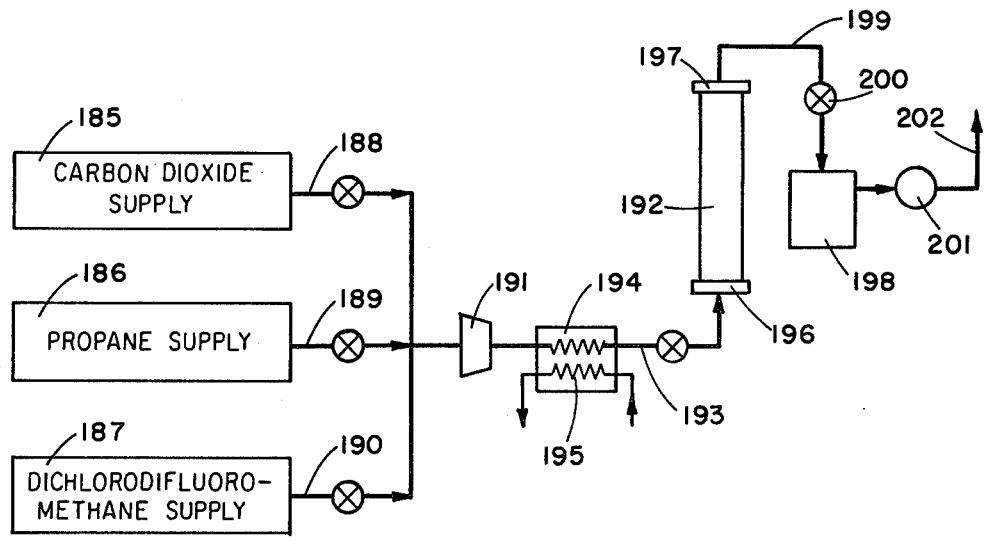
FIG. 4 is a diagram of an apparatus used to evaluate various extractants to remove oil from drill cuttings.

A number of extraction runs were made to remove oil from muds, from cuttings separated from muds and from sand mixed with fuel oil to simulate a material which could result from an oil spill or to simulate sands or other inorganic-rich mineral solids laden with oil. Generally, the muds as they came up from offshore wells were about 50% by weight cuttings. In some cases the cuttings after separation from mud were hand crushed. These extraction runs were made in the apparatus diagrammed in FIG. 4. Carbon dioxide was supplied at about 57 atmospheres from a cylinder 185, propane at about 8.5 atmospheres from a cylinder 186 and dichlorodifluoromethane (Freon 12 ®) at about 6 atmospheres from a cyliner 187. Valve controlled lines 188, 189 and 190 led from cylinders 185, 186 and 187, respectively, to a compressor 191 which in turn was connected to a high-pressure extractor 192 through line 193. A heat exchanger 194 was interposed in line 193 and provided with coils 195 to circulate a heat transfer fluid to adjust the temperature of the high-pressure extractant to the desired level before entering extractor 192. Extractor 192 was a length of high-pressure stainless steel piping with fluid-tight couplings 196 and 197 to seal it. The mud, cuttings or sand from which the oil was to be extracted was placed in extractor 192. The effluent from extractor 192 as discharged into oil collector 198 through a high-pressure fluid discharge line 199 in which there was a pressure reduction valve 200 designed to reduce the pressure to one atmosphere. The extractant was then discharged through a volume meter 201 and a vent 202 and the character of the cuttings was noted and the amount of oil removed was measured.

TABLE 1

REMOVAL OF OIL FROM PARTICULATE MATERIALS USING VARIOUS EXTRACTANTS

| Ex. No. | Sample Identification | Sample Particles Contained | Weight (g) | Extractant Identification | Extractant Amount (g) | Extractant Temperature (°C.) | Extractant Pressure (psia) | Oil Ext'd. (g) | Character of Products Oil | Character of Products Extracted Particles |
|---|---|---|---|---|---|---|---|---|---|---|
| 1 | drilling mud | cuttings mud fines | 48.6 | $CO_2$ | 36.4 | 30 | 1400–1500 | 1.56 | clear | gray, dry, non-oily, free flowing |
| | | | | | 43.7 | 31–33 | 3000 | 0.9 | | |
| | | | | | 36.4 | 45 | 1500–1800 | 0.39 | | |
| | | | | | 36.4 | 55 | 2800–3200 | 0.66 | | |
| 2 | | cuttings −20 mesh | 10 | $CO_2$ | 380 | 50 | 2500 | 4.86 | clear | gray, dry, non-oily, 150 ppm hydrocarbons |
| 3 | | cuttings −20 mesh | 49.3 | $CO_2$ | 180 | 30–45 | 2000–2300 | | clear | dry, non-oily, water-wettable, very small amount of finest material floated on water surface |
| 4 | | cuttings −20 mesh | 300 | $CO_2$ | 1000 | 45 | 2200 | 30 | clear | dry and non-oily |
| 5 | | cuttings −20 mesh | 32.3 | propane | 89 | 60 | 500–1200 | 3.5 | clear | gray, dry, non-oily; produced no oil sheen on surface when put in water; 2400 ppm hydrocarbons |
| 6 | drilling mud | cuttings −20 mesh; fines | | propane | 25.5 | 60 | 500–900 | 3.4 | clear | |
| 7 | | cuttings −20 mesh | | Freon 12 ® | 65 | 65 | 600–1100 | 2.7 | clear | gray, dry, non-oily |
| | | | | | 125 | | | 0.4 | | |
| 8 | asphalt based | shale cuttings | 34.4 | $CO_2$ | 73 | 50 | 2200 | 0.1 | clear | mud fines and cuttings light brown, dry, free-flowing, slight residual hydrocarbon odor |
| | | | | | 73 | 65–70 | 3000 | 1.2 | | |
| 8a | drilling mud | mud fines | | Freon 12 ® | 140 | 60 | 500–1200 | 1.9 | clear | |
| | | | | | 170 | | | 1.4 | | |
| | | | | | 200 | | | 0.4 | | |
| 9 | sand + 14 wt. % No. 4 fuel oil | sand +30 mesh | 32.6 | Freon 12 ® | 40 | 45–50 | 500–1200 | 3.8 | heavy oil, like No. 4 | light brown, no odor, free flowing |
| | | | | | 88 | | | 0.2 | | |

The results on nine such runs are tabulated in Table 1. In Examples 2, 3, 4, 5 and 7 the cuttings were separated from an oil-based mud and ground to pass a 20-mesh Tyler sieve. In the use of propane and Freon 12 ®, the extractants were in a relatively incompressible state at the temperatures used and their pressures varied with the on/off cycling of the compressor over the ranges given. In Examples 2 and 5, for which ppm of hydrocarbons remaining on the cuttings are given, the measurements were made in the following manner. The cuttings which were removed from high-pressure extractor 192 after extraction were then extracted with methylene chloride, the methylene chloride extractant was dissolved in carbon tetrachloride and the infrared absorbence of the resulting mixture was compared with the infrared absorbence of standards made up with measured concentrations of the collected oil in carbon tetrachloride.

It will be seen from the data of Table 1 that the three extractants used were capable of extracting oil from the drill cuttings. Carbon dioxide, which poses no real pollution or environmental problems, was particularly effective in this role.

The method and apparatus of this invention make possible the removal of oil from drill cuttings to a level which permits the cuttings to be disposed of without creating undesirable pollution problems. In offshore drilling, where the use of oil-based drilling muds is highly desirable, this means that the apparatus can be located on a drilling rig and the cleaned drill cuttings can be dumped overboard. The method and apparatus of this invention are also applicable to the removal of oil and other organic contaminants from particulate, inorganic rich mineral solids, for example the removing oil from sands whether it was mixed with the sands accidentally or by geological design. The method offers a choice of extractant, operating conditions and manner of handling the solids to be treated and the products of the extraction.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. A system comprising elements arranged, sized and dimensioned for removing organic contaminants including oil from particulate, inorganic-rich mineral solids, including:
   (a) pressure vessel means arranged to effect contact between particulate, inorganic-rich, mineral solids containing an organic contaminant and an extractant for said contaminant, which extractant under ambient conditions is a gas and which throughout said contact is maintained under conditions of pressure and temperature to convert it to a fluidic solvent state for said contaminant;
   (b) extractant supply means for providing said extractant in said fluidic solvent state;
   (c) means, including pressurized fluid supply conduit means and first pressurized fluid withdrawal conduit means, for circulating said extractant in said fluidic solvent state through said pressure vessel means and in contact with said solids so as to form an essentially single-phase primary effluent containing said contaminant;
   (d) means, including second pressurized fluid withdrawal conduit means, for removing residual effluent from said pressure vessel means as an essentially single-phase residual effluent; said first and second pressurized fluid withdrawal conduit means terminating in common in a main pressurized fluid conduit means for combining said residual effluent with said primary effluent;
   (e) depressurizing means in fluid communication with said main pressurized fluid conduit means for depressurizing the resulting combined, essentially single-phase effluent to form two separable phases comprising a vapor phase containing said extractant and a liquid phase containing said contaminant;
   (f) separating means for separating said vapor and liquid phases; and
   (g) means for withdrawing the essentially contaminant-free solids from said pressure vessel means for disposal.

2. A system in accordance with claim 1 wherein said means for removing said residual effluent from said pressure vessel means comprise means for forcing a water-piston upwardly through said pressure vessel means, thereby providing said essentially contaminant-free solids.

3. A system in accordance with claim 1 wherein said means for withdrawing said essentially contaminant-free solids from said pressure vessel means comprises means for directing a stream of water through said pressure vessel means with sufficient force to carry said solids from said vessel.

4. A system in accordance with claim 3 including means for compacting said essentially contaminant-free solids into bricks or the like.

5. A system in accordance with claim 1 wherein said depressurizing means is staged, the first-stage of which is arranged for reducing the pressure to a level just below that at which said two separable phases form; and wherein said separating means comprise
   (a) evaporator means having a distillation zone and a reboiler zone;
   (b) means for compressing said extractant vapor withdrawn from said distillation zone and for circulating the compressed vapor in indirect heat exchange means with said liquid phase in said reboiler zone;
   (c) transfer line means in fluid communication with said heat exchange means comprising said extractant supply means; and
   (d) means for withdrawing contaminant-containing bottoms from said reboiler zone.

6. A system in accordance with claim 5 including a second-stage depressurizing means arranged for reducing the pressure of said contaminant-containing bottoms withdrawn from said reboiler zone to an intermediate pressure; and wherein said separating means comprise, in combination
   (a) intermediate-pressure flash tank means;
   (b) means for compressing said extractant vapor withdrawn from said flash tank means and for returning the compressed vapor to said evaporator means; and
   (c) means for withdrawing contaminant-enriched bottoms from said intermediate-pressure flash tank means.

7. A system in accordance with claim 6 including a third-stage depressurizing means arranged for reducing the pressure of said contaminant-enriched bottoms withdrawn from said intermediate-pressure flash tank means to a pressure approximating ambient; and wherein said separating means comprises, in combination
   (a) low-pressure flash tank means;
   (b) means for compressing said extractant vapor withdrawn from said low-pressure flash tank means and for returning the compressed vapor to said intermediate-pressure flash tank means; and
   (c) means for withdrawing essentially extractant-free contaminant from said low-pressure flash tank means.

8. A system in accordance with claim 1 including means for conveying said mineral solids to said pressure vessel means.

9. A system in accordance with claim 8 wherein said contaminant is oil and said mineral solids are drill cuttings in a drilling mud, and said system includes means for separating said cuttings from said mud prior to their being conveyed to said pressure vessel means.

10. A system in accordance with claim 9 including means for crushing said drill cutting subsequent to their being separated from said mud.

11. A system in accordance with claim 8 wherein said means for conveying said mineral solids comprise slurry forming means for forming a pumpable slurry of said mineral solids containing said contaminant and a slurrying liquid; and pumping means for transferring said slurry from said slurry forming means to said pressure vessel means.

12. A system in accordance with claim 11 including means for adjusting the temperature of said slurry to approximate the temperature of said fluidic solvent-state extractant.

13. A system in accordance with claim 11 including means for removing excess slurrying liquid from said pressure vessel means prior to circulation of said extractant.

14. A system in accordance with claim 11 wherein said mineral solids are drill cuttings in an oil-based mud and said slurrying liquid is oil; and wherein said depressurizing means is staged, the first-stage of which is arranged for reducing the pressure to a level just below that at which said two separable phases form; and wherein said separating means comprise
   (a) evaporator means having a distillation zone and a reboiler zone;
   (b) means for compressing said extractant vapor withdrawn from said distillation zone and for circulating the compressed vapor in indirect heat exchange means with said liquid phase in said reboiler zone;
   (c) transfer line means in fluid communication with said heat exchange means comprising said extractant supply means; and
   (d) means for withdrawing oil-containing bottoms from said reboiler zone.

15. A system in accordance with claim 14 including a second-stage depressurizing means arranged for reducing the pressure of said oil-containing bottoms withdrawn from said reboiler zone to an intermediate pressure; and wherein said separating means comprise, in combination
   (a) intermediate-pressure flash tank means;
   (b) means for compressing said extractant vapor withdrawn from said flash tank means and for returning the compressed vapor to said evaporator means; and
   (c) means for withdrawing oil-enriched bottoms from said intermediate-pressure flash tank means.

16. A system in accordance with claim 15 including a third-stage depressurizing means arranged for reducing the pressure of said oil-enriched bottoms withdrawn from said intermediate-pressure flash tank means to a pressure approximating ambient; and wherein said separating means comprise, in combination
   (a) low-pressure flash tank means;
   (b) means for compressing said extractant vapor withdrawn from said low-pressure flash tank means and for returning the compressed vapor to said intermediate-pressure flash tank means; and
   (c) means for withdrawing essentially extractant-free oil from said low-pressure flash tank means.

17. A system in accordance with claim 16 including means for returning at least a portion of said extractant-free oil to said slurry forming means.

* * * * *